US011380181B2

(12) United States Patent
Cheng et al.

(10) Patent No.: US 11,380,181 B2
(45) Date of Patent: Jul. 5, 2022

(54) DOPPLER RADAR SYSTEM WITH MACHINE LEARNING APPLICATIONS FOR FALL PREDICTION AND DETECTION

(71) Applicant: MS Technologies, Rockville, MD (US)

(72) Inventors: Shuchuan Jack Cheng, Potomac, MD (US); Yuan-Ming Fleming Lure, Potomac, MD (US)

(73) Assignee: MS TECHNOLOGIES, Rockville, MD (US)

( * ) Notice: Subject to any disclaimer, the term of this patent is extended or adjusted under 35 U.S.C. 154(b) by 0 days.

(21) Appl. No.: 17/116,686

(22) Filed: Dec. 9, 2020

(65) Prior Publication Data

US 2022/0180723 A1 Jun. 9, 2022

(51) Int. Cl.
```
G08B 21/00    (2006.01)
G08B 21/04    (2006.01)
G06N 20/00    (2019.01)
G01S 13/62    (2006.01)
G08B 27/00    (2006.01)
```
(52) U.S. Cl.
CPC ............ G08B 21/043 (2013.01); G01S 13/62 (2013.01); G06N 20/00 (2019.01); G08B 27/005 (2013.01)

(58) Field of Classification Search
CPC ..... G08B 21/043; G08B 27/005; G01S 13/62; G06N 20/00
See application file for complete search history.

(56) References Cited

U.S. PATENT DOCUMENTS

| | | | | |
|---|---|---|---|---|
| 11,030,540 B2* | 6/2021 | Kratz | ................ | G06N 20/00 |
| 11,055,981 B1* | 7/2021 | Kurfirst | ................ | G08B 29/185 |
| 2009/0042527 A1* | 2/2009 | Niknejad | ................ | H04W 52/0245 |
| | | | | 455/234.2 |
| 2013/0082842 A1* | 4/2013 | Balazs | ................ | G08B 21/043 |
| | | | | 340/573.1 |
| 2013/0294219 A1* | 11/2013 | Peck | ................ | H04L 27/2637 |
| | | | | 370/210 |
| 2015/0020571 A1* | 1/2015 | Chan | ................ | G01P 21/00 |
| | | | | 73/1.38 |
| 2016/0180234 A1* | 6/2016 | Siebach | ................ | G06Q 10/1053 |
| | | | | 705/321 |
| 2016/0247091 A1* | 8/2016 | McCaffrey | ................ | G06K 9/6253 |
| 2017/0109990 A1* | 4/2017 | Xu | ................ | G08B 21/043 |
| 2018/0284223 A1* | 10/2018 | Otsuki | ................ | G01S 13/003 |
| 2019/0057777 A1* | 2/2019 | Joshi | ................ | A61B 5/7221 |

(Continued)

*Primary Examiner* — Ojiako K Nwugo
(74) *Attorney, Agent, or Firm* — Galvin Patent Law LLC; Brian R. Galvin

(57) ABSTRACT

A system for passively predicting and detecting falls using one or more dual-polarized Doppler radars and machine learning algorithms. The system is typically implemented for use in predicting or detecting falls in older adults and may be connected with various systems that can alert emergency services or hospice personnel in the event of a fallen individual. Furthermore, the system overcomes conventional radar systems by integrating vertical and horizontal micro-Doppler signatures into a combined signature which is analyzed by machine learning algorithms to correctly and expeditiously predict and detect a variety of human movements. The system also finds applications wherever micro-Doppler signals may be generated such as predicting or detecting behaviors or movements over time to detect and predict the onset of diseases and other disabilities.

19 Claims, 12 Drawing Sheets

(56) References Cited

U.S. PATENT DOCUMENTS

| | | | |
|---|---|---|---|
| 2020/0090055 A1* | 3/2020 | Harrison | G06N 20/00 |
| 2020/0143656 A1* | 5/2020 | Li | G08B 21/043 |
| 2020/0378758 A1* | 12/2020 | Yang | G08B 21/0469 |
| 2021/0052198 A1* | 2/2021 | Parvaneh | A61B 5/0205 |
| 2021/0096216 A1* | 4/2021 | Rigazio | G01S 7/40 |
| 2021/0166545 A1* | 6/2021 | Saporito | G08B 31/00 |

* cited by examiner

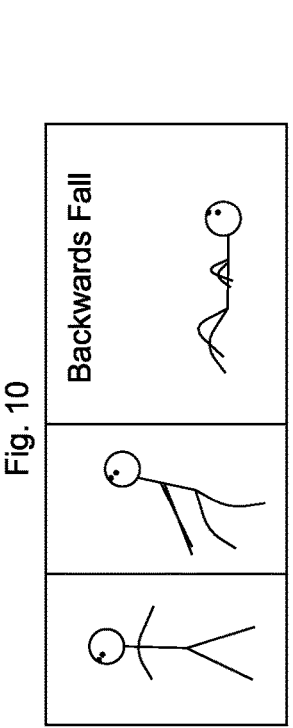
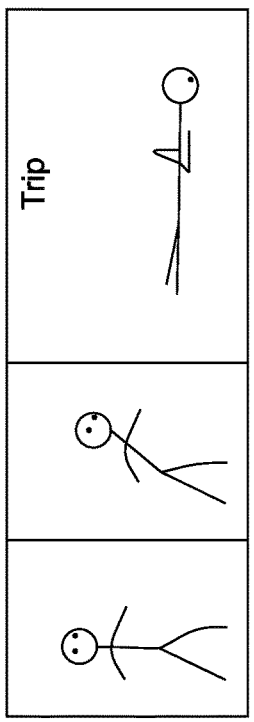
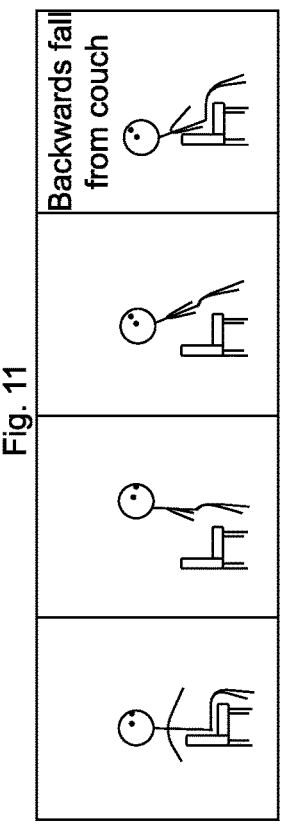
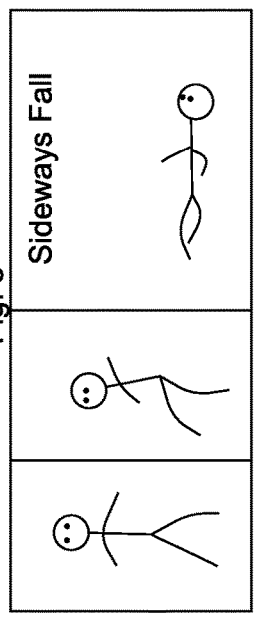
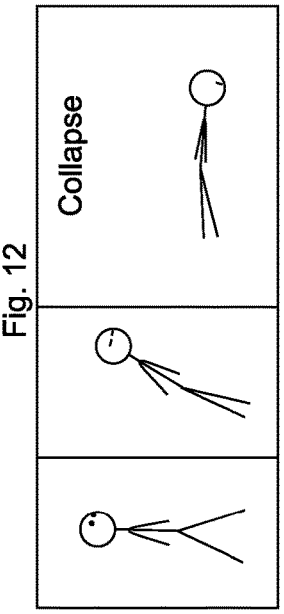
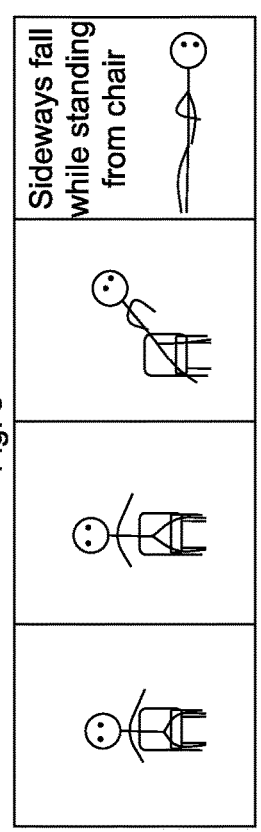
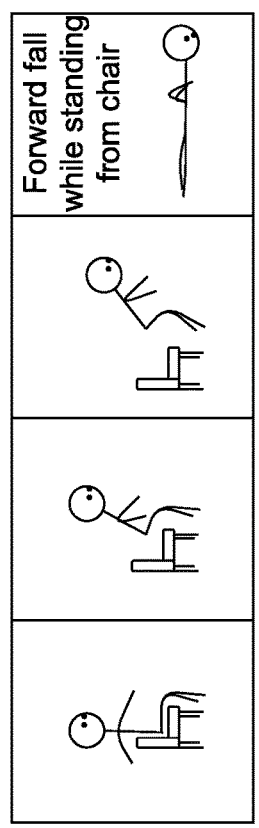

DOPPLER RADAR SYSTEM WITH
MACHINE LEARNING APPLICATIONS FOR
FALL PREDICTION AND DETECTION

CROSS-REFERENCE TO RELATED
APPLICATIONS

None.

BACKGROUND

Field of the Art

The disclosure relates to the field of radar systems, and more particularly to the field of motion tracking and machine learning.

Discussion of the State of the Art

Falls are a primary cause of morbidity and mortality among the older adult population in the United States. Furthermore, based on demographic projections of the older adult population in coming decades, falls will increase as a public health and economic concern. To enhance or to maintain an older adult's confidence and independence, as well as enabling rapid and timely post-fall responses, the use of passive and economically feasible technologies to predict and/or detect falls is of the utmost importance.

Wearable technologies have attempted to address the problem but ultimately failed because they are intrusive, rely on user compliance, and often uncomfortable. Non-wearable, or ambient, sensors overcome this, but can introduce privacy concerns (e.g., using video), or may require an excessive amount of sensors (e.g., vibration, infrared, microphone, etc.), and are less effective for predicting or detecting the broad spectrum of fall types. Lacking is a comprehensive and reliable system for predicting or detecting and monitoring human activities for use in typical indoor environments while also automatically responding to said human activities.

What is needed is a passive, ambient fall prediction or detection and monitoring system coupled with machine learning capabilities for predicting or detecting and acting on various human activities.

SUMMARY

Accordingly, the inventor has conceived and reduced to practice, a system and method for passively predicting and detecting falls using one or more dual-polarized Doppler radars and machine learning algorithms. The system is typically implemented for use in predicting or detecting falls in older adults and may be connected with various systems that can alert emergency services or hospice personnel in the event of a fallen individual. Furthermore, the system overcomes conventional radar systems by integrating vertical and horizontal micro-Doppler signatures into a combined signature which is analyzed by machine learning algorithms to correctly and expeditiously predict and detect a variety of human movements. The system also finds applications wherever micro-Doppler signals may be generated such as detecting behaviors or movements over time to detect and predict the onset of diseases and other disabilities.

According to a preferred embodiment, a system for fall prediction and detection comprising: a computing device comprising a memory, a processor, and a non-volatile data storage device; and a radio-frequency module comprising electronic components that cause the radio-frequency module to: transmit an electromagnetic wave; receive a reflected electromagnetic wave; convert the reflected electromagnetic wave into a digital signal; and send the digital signal to a processor module; a processor module comprising a first plurality of programming instructions stored in the memory of, and operating on the processor of, the computing device, wherein the first plurality of programming instructions, when operating on the processor, cause the computing device to: receive the digital signal; process the digital signal into a spectrogram; process the spectrogram through one or more machine learning algorithms for predicting and detecting falls.

According to another preferred embodiment, a method for fall prediction and detection is disclosed comprising the steps of: transmitting an electromagnetic wave; receiving a reflected electromagnetic wave; converting the reflected electromagnetic wave into a digital signal; and processing the digital signal into a spectrogram; processing the spectrogram through one or more machine learning algorithms for predicting and detecting falls.

According to various aspects of the invention, a system for fall prediction and detection uses one or more dual-polarized radio frequency modules whereby a pair of orthogonal electromagnetic waves are transmitted and received into a combined spectrogram processed by one or more machine learning algorithms for predicting and detecting falls; a processor module may be a software defined radio that can dynamically adapt to an available communication environment; a processor module may be connected to a network whereby upon detection of a specified event, an alarm or notification is triggered; machine learning algorithms may detect any movement or behavior; machine learning algorithms may be trained on time-series data; machine learning algorithms may be computed on a cloud-based Internet service; a processor module may operate as a distributed computing platform; a graphical user interface may be used whereby a user may interact with a radio frequency module or processor module inputs, settings, and outputs; a combined spectrogram and machine learning algorithms may be used to assist in diagnosis of human conditions.

According to another preferred embodiment, a system for fall prediction and detection comprising: a smart phone comprising a memory, a processor, and a non-volatile data storage device; and a radio-frequency module comprising electronic components that cause the radio-frequency module to: transmit an electromagnetic wave; receive a reflected electromagnetic wave; convert the reflected electromagnetic wave into a digital signal; and send the digital signal to a processor module; a processor module comprising a first plurality of programming instructions stored in the memory of, and operating on the processor of, the computing device, wherein the first plurality of programming instructions, when operating on the processor, cause the computing device to: receive the digital signal; process the digital signal into a spectrogram; process the spectrogram through one or more machine learning algorithms for predicting and detecting falls.

BRIEF DESCRIPTION OF THE DRAWING
FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is one example of a fall type predicted or detected by a dual-polarized machine learning capable micro Doppler radar system.

FIG. 8 is a second example of a fall type predicted or detected by a dual-polarized machine learning capable micro Doppler radar system.

FIG. 9 is a third example of a fall type predicted or detected by a dual-polarized machine learning capable micro Doppler radar system.

FIG. 10 is a fourth example of a fall type predicted or detected by a dual-polarized machine learning capable micro Doppler radar system.

FIG. 11 is a fifth example of a fall type predicted or detected by a dual-polarized machine learning capable micro Doppler radar system.

FIG. 12 is a sixth example of a fall type predicted or detected by a dual-polarized machine learning capable micro Doppler radar system.

FIG. 13 is a seventh example of a fall type predicted or detected by a dual-polarized machine learning capable micro Doppler radar system.

DETAILED DESCRIPTION

Figure 1:
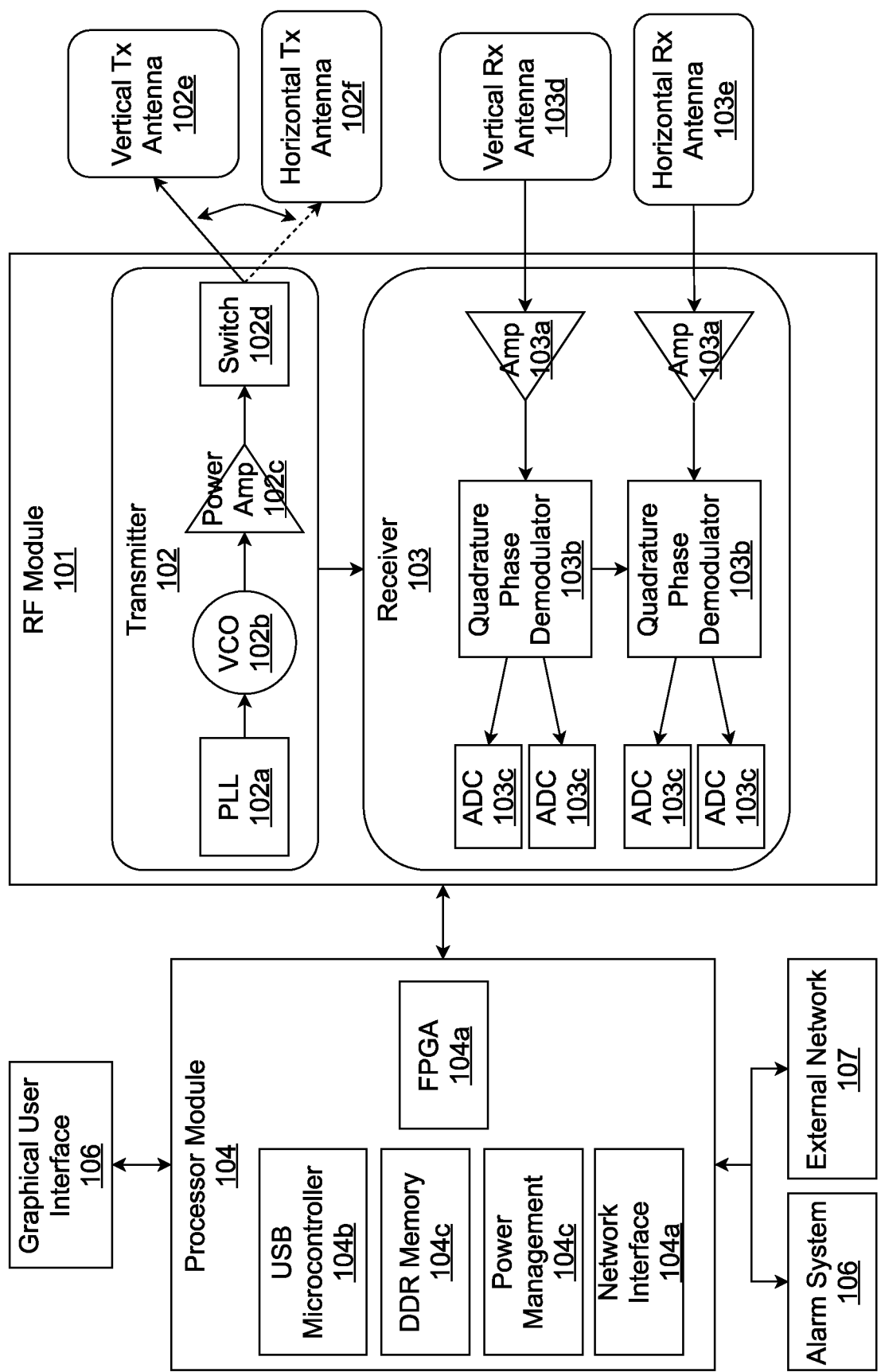
FIG. 1 is a block diagram illustrating an exemplary system architecture for a dual-polarized machine learning capable micro Doppler radar system, according to one embodiment.

The inventor has conceived, and reduced to practice, a system and method for passively predicting and detecting falls using one or more dual-polarized Doppler radars and machine learning algorithms. The system is typically implemented for use in predicting or detecting falls in older adults and may be connected with various systems that can alert emergency services or hospice personnel in the event of a fallen individual. Furthermore, the system overcomes conventional radar systems by integrating vertical and horizontal micro-Doppler signatures into a combined signature which is analyzed by machine learning algorithms to correctly and expeditiously predict and detect a variety of human movements. The system also finds applications wherever micro-Doppler signals may be generated such as predicting or detecting behaviors or movements over time to predict or detect and predict the onset of diseases and other disabilities.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture for a dual-polarized machine learning capable micro Doppler radar system, according to one embodiment. According to a preferred embodiment, a dual-polarized machine learning capable micro Doppler radar system comprises a radio-frequency (RF) module 101 and a processor module 104 such that range information may be obtained by measuring a beat frequency via Fast Fourier Transforms (FFT). In one such embodiment, an RF module 101 additionally uses a transmitter 102 that employs a phase-locked-loop (PLL) 102a to lock a RF output frequency to a phase of a stable reference oscillator 102b. Transmitter 102 also uses a power amplifier 102c to a switch 102d which alternates transmitting radio waves between a vertically-polarized antenna 102e and a horizontally-polarized antenna 102f.

A receiver 103 may comprise a vertical receive antenna 103d that picks up vertically-polarized reflected radio waves from vertical transmit antenna 102e. A receiver 103 may also comprise a horizontal receive antenna 103e that picks up horizontally-polarized reflected radio waves from horizontal transmit antenna 102f. A receiver 103 may also comprise both vertical 103d and horizontal receive antenna 103e. Received radio waves may be processed through a low noise amplifier 103a before being passed to a quadrature phase demodulator 103b which is used to avoid the self-image effect. Furthermore, a received complex signal may be directly mixed with a complex local oscillator from voltage-controlled oscillator 102b such that only one sideband of a received complex signal may be converted to a baseband frequency region. A series of analog-to-digital convertors 103c may convert radio waves from analog to digital before forwarding the now-digital radio signal to a processor module 104. According to one aspect, dual-polarized antennas 102e/102f/103d/103e may be horn types or microstrip patches, which may use both horizontal and vertical ports of a coaxial-feed.

According to a preferred embodiment, processor module 104 may use an FPGA (field-programmable gate array) 104a as a microcontroller and microprocessor. Other microcontrollers and microprocessors known in the art may be substituted as desired. Typical components of a processor module 104 include USB microcontrollers 104b, DDR memory 104c or other memory modules, power management systems 104c, and network interfaces 104a such as ethernet or Wi-Fi. According to a preferred embodiment, a processor module 104 may act as a SDR (software-defined radio) offering compactness and flexibility by supporting operation mode, waveform, bandwidth, and processing functions through software protocols. An SDR may provide various abilities to integrate various software-defined functions for range and Doppler (velocity) measurements and sensing of micro-motions.

Other aspects include a use of highly integrated systems-on-chip (SoC) in both RF module 101 and processor module 104. This contributes to an overall form factor in order to achieve compactness, lightweight, and low power consumption. A graphical user interface (GUI) 106 may be used to select various options on signal waveforms, operating parameters, filtering types, and lengths of data recording; doing so may enable rapid data collection during fall experiments and for a subsequent development of fall prediction or detection classification algorithms. A GUI may clearly display baseband signals in the time, frequency, and combined time-frequency domains in real time, and display micro-Doppler and polarization signatures.

An additional aspect of a preferred embodiments may use zero-intermediate frequency architecture. In other embodiments, homodyne receivers are preferred. A processor module 104 may also be connected to an alarm system 106 (e.g., 911 emergency services, hospital notification system, etc.) or to any external network 107 whereby upon detecting events, signals may be sent or received to trigger alarms, notifications (i.e., email, text messaging, etc.), mechanical devices, electronic devices, or other mechanisms or actions by which event-detection precedes an action.

Figure 2:
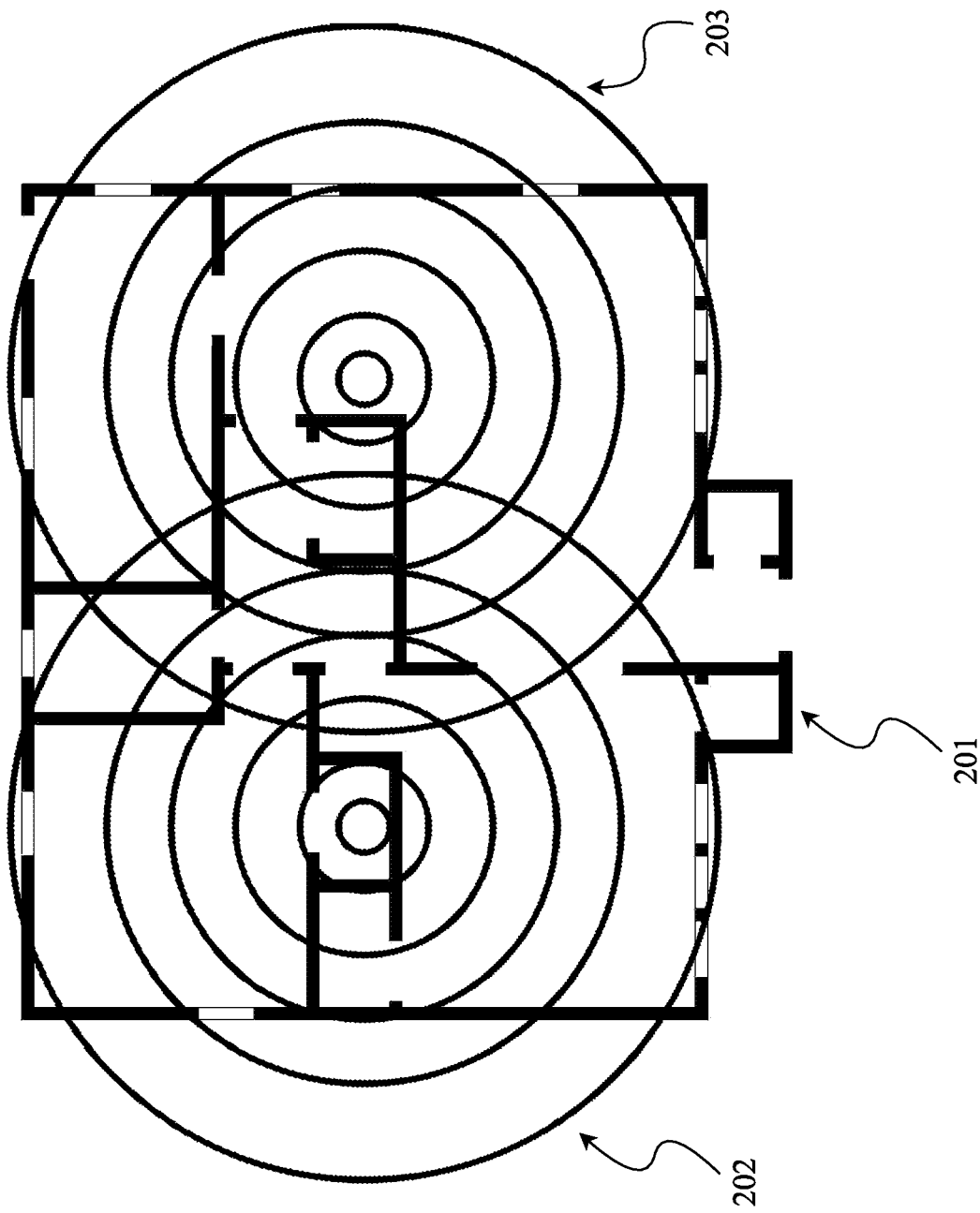
FIG. 2 is a diagram illustrating a use of multiple dual-polarized machine learning capable micro Doppler radar systems to overcome known radar limitations.

FIG. 2 is a diagram illustrating a use of multiple dual-polarized machine learning capable micro Doppler radar systems to overcome known radar limitations. The micro doppler effect is a physical phenomenon that moving objects affect frequency of receiving radar signals. Compared to other ambient sensor systems like video-based, micro doppler radar system has advantages. It can go through walls 201 and is not sensitive to lighting conditions while also posing less privacy concerns. However, because micro doppler effects may become weaker when an object is moving away from or orthogonal to the line of sight of a radar 202/203, an embodiment of two or more dual-polarized machine learning capable micro Doppler radar systems is preferred.

Additionally, because radar signals reflect, especially, in an indoor environment, reflection can be a major source of noise. A typical house 201 is an enclosed space cluttered with various objects, in which there is destructive interference due to multipath (i.e., signals 202/203 can reach a receiving antenna via one or multiple paths). To overcome such destructive interference, one embodiment of a dual-polarized machine learning capable micro Doppler radar systems may support polarization diversity (the combination of orthogonal antenna pairs) which may yield more reliable performance under a multipath environment than conventional Doppler radar systems.

According to another preferred embodiment, a system may be built on software define radio (SDR) technology to fully harness a spectrum-sharing band available in the United States. One aspect of is to incorporate an intelligent wireless system that can dynamically adapt to an available communication environment; hence, SDR use is "future-proof" and is a preferred embodiment. Although SDR is not the only type of radio that may be used. Some applications may call for hardware-based radios or radios with NSA-type encryption as a few examples and the invention is not limited by examples contained herein.

Figure 3:
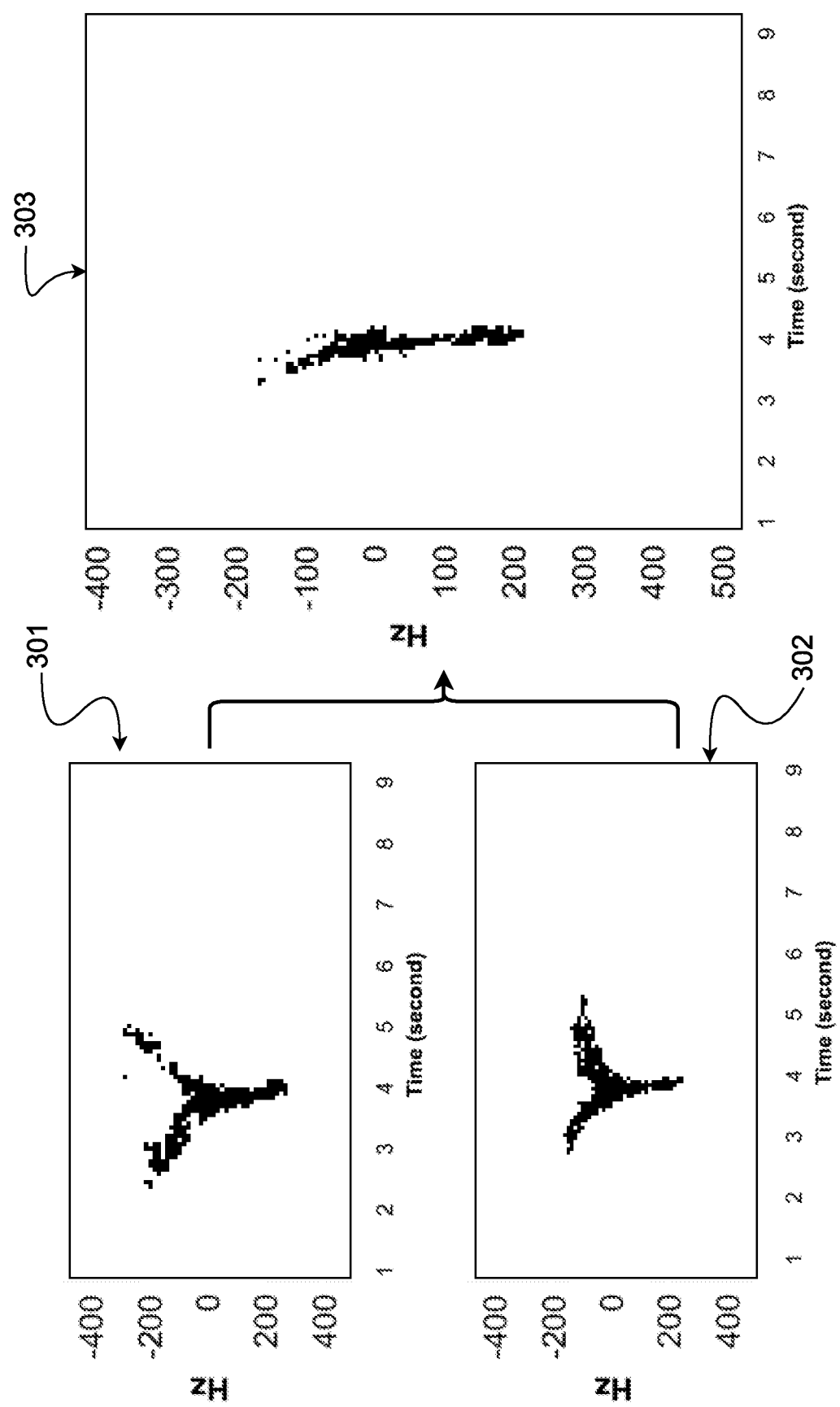
FIG. 3 is a diagram of an exemplary cross spectrogram of a backwards fall.

FIG. 3 is a diagram of an exemplary cross spectrogram of a backwards fall. Since a body is an elongated object with a high aspect ratio, linearly decomposed components (vertical 301 vs. horizontal 302 polarizations) of a Doppler signal vector will be different though correlated, and a relative strength difference 303 between the components 301/302 will be sensitive to a change in body orientation. Use of dual-polarized Doppler radar can thus generate more accurate and information-rich signatures distinguishing various fall events/patterns, allowing for a significant reduction in false alarms compared with single-polarized radar. This diagram is a simplified version of an actual spectrogram of a backwards fall performed by a person. The combination of spectrograms 301/302 lead to a unique spectrogram signature 303 particular to a specified event.

Figure 4:
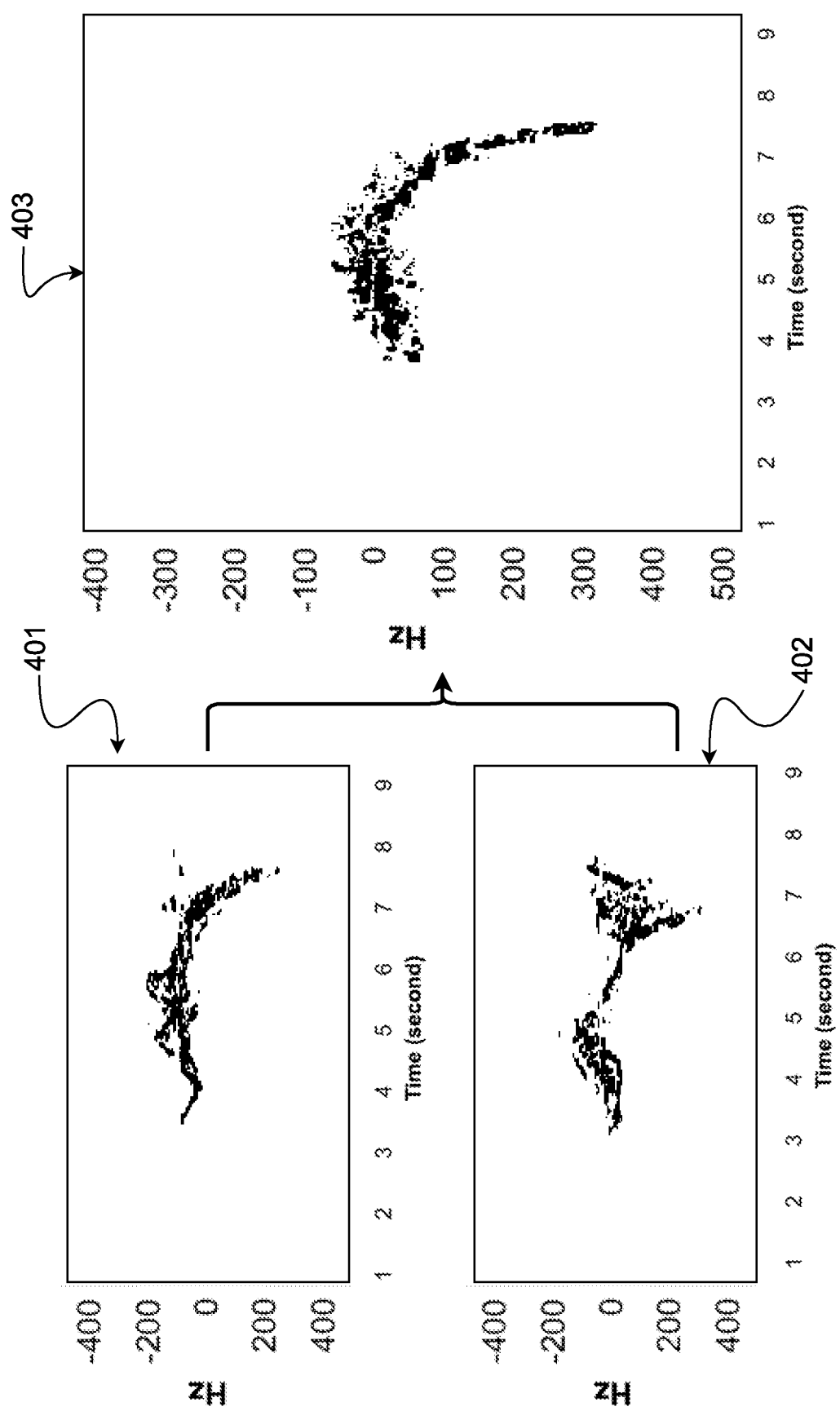
FIG. 4 is a diagram of an exemplary cross spectrogram of a person sitting in a chair.

FIG. 4 is a diagram of an exemplary cross spectrogram of a person sitting in a chair. As noted previously, the polarization diversity with respect to spectrograms leads to unique signatures for all periodic and a periodic human movement. In this example, a vertically polarized signature 401 is combined with a horizontally polarized signature 402 to generate a highly accurate spectrogram signature of a person sitting in a chair 403.

Figure 5:
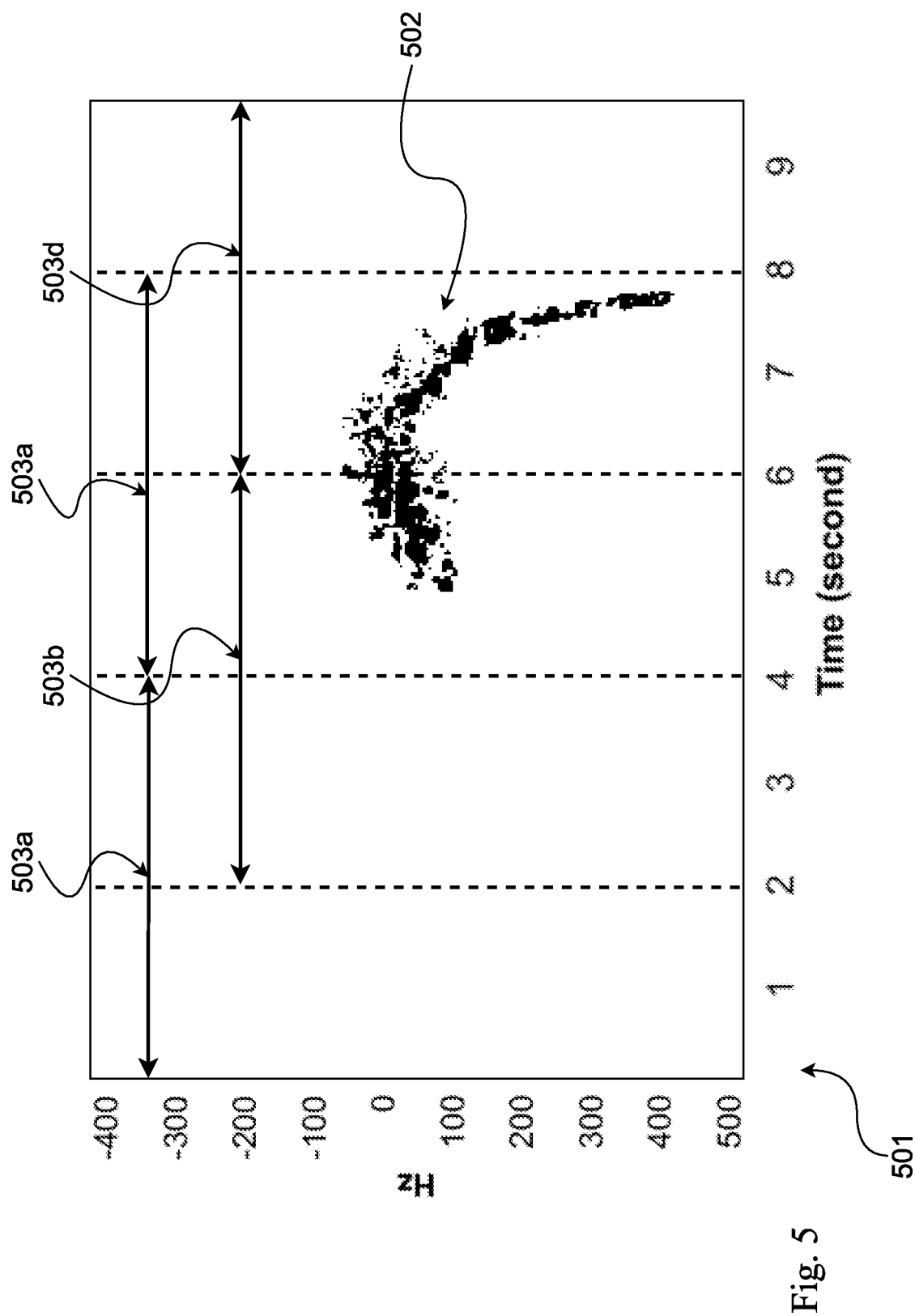
FIG. 5 is a diagram illustrating a use of a cross spectrogram by machine learning algorithms.

FIG. 5 is a diagram illustrating the use of a cross spectrogram 501 by machine learning algorithms. According to one embodiment, cross spectrograms are used to represent a time-frequency distribution of the measured micro-Doppler signature from the two systems, defined using:

$$XY(m, \omega) = \sum_{-\infty}^{\infty} X[n]\overline{Y[n]}w[n-m]e^{j\omega n}$$

where $X[n]$ is the signal received from one radar system, $\overline{Y[n]}$ is the conjugate of the signal received from the other system, and $w[m]$ is a windowing function. A Hanning window is used with a length of 256 samples and 1024 FFT points. To classify spectrograms from a two radar systems, a pretrained convolutional neural network is used.

According to one embodiment, GoogLeNet is implemented into the machine learning approach where GoogLeNet is a 22-layer deep network using nine inception modules and takes a 224×224 image as input. In such an embodiment, a transfer learning approach may be used to fine-tune the GoogLeNet to model and classify experimental data. The spectrogram image 501 may be further segmented from each trial to have a span of 4 seconds with 50% overlap 503a-d, and each 4-second segment 503a-d may be saved as a 224×224 RGB image. GoogLeNet may then be re-trained with 80% of the images from all participants, and subsequently validated with the remaining 20%. A network may be adjusted to classify the signature 502 into three specific categories: fall, sitting, and remaining activities, or any number of categories desired by the application.

According to one aspect, for a classified fall, a subsequent GoogLeNet network may be set to classify the fall as soft or hard. According to one embodiment, soft and hard falls may be distinguished by if persons falling slowed it down by bending his or her knees, using his or her hands, etc., and made relatively soft contact on the floor; otherwise the fall may be considered a hard fall. Furthermore, a network may be trained and validated any number of machine learning algorithms and methods such as using the deep learning toolbox in MATLAB™ (2018b, Mathworks) or generative neural networks or any other machine learning or deep learning method desired by the implementors of the embodiment.

This embodiment may be used for predicting or detecting more than falls and typical human movements. Any aperiodic or periodic motion that creates micro-Doppler effects may be analyzed by the embodiments contained herein.

Detailed Description of Exemplary Aspects

Figure 6:
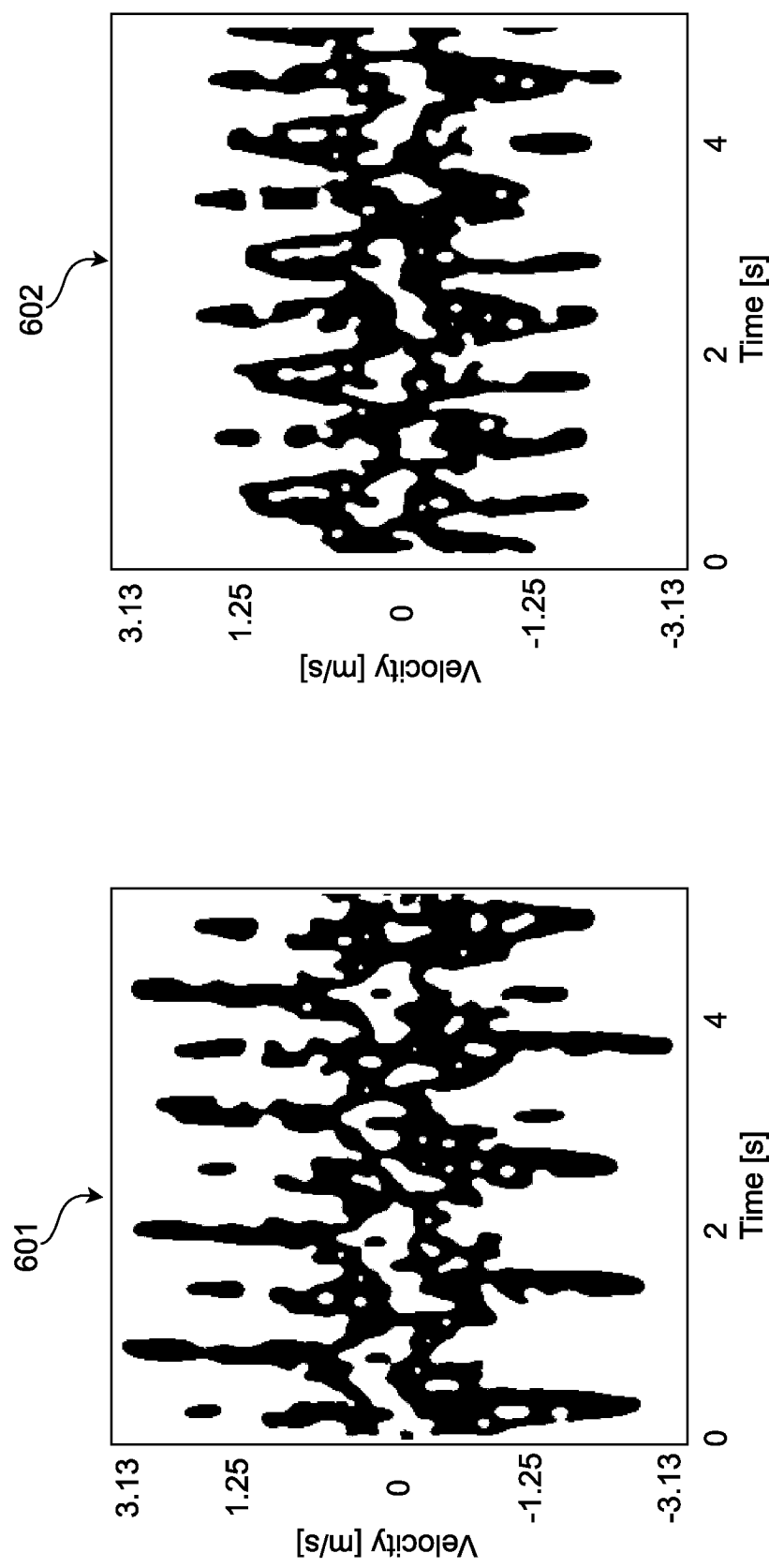
FIG. 6 is a diagram of vertical and horizontal micro-Doppler signatures of a human walking.

FIG. 6 is a diagram of vertical 601 and horizontal 602 micro-Doppler signatures of a human walking. This diagram illustrates the use of a dual-polarized Doppler radar system for use with periodic movements. By analyzing the signatures of typical periodic human movements, a dual-polarized Doppler radar system may better predict or detect aperiodic events such as falls. Other aspects include measuring the time a person has been immobile. As an example, if an older adult who lives alone is found to have sat in a chair and not performed a significant movement during a specified amount of time, next-of-kin or emergency services may be notified.

Kinematic characteristics of human body movements are often embedded in the reflected radar signals from the body and limbs. Micro-Doppler signatures extracted from radar received signals can describe the movement of human body and limbs. Walking is a typical human articulated and periodic motion. One cycle of the gait consists of a left-leg swing and a right-leg swing. Each forward leg swing appears as large peaks in its micro-Doppler signature 601/602. The body torso motion is the stronger component underneath the leg swings tends to have a slightly saw-tooth shape due to the body speeds up and slows down during the swing, as shown in micro-Doppler signatures 601/602. Therefore, a micro-Doppler signature becomes the distinctive characteristics of the movement that give human body movement its identity, such as walking, running, jumping, or falling.

During periodic human walking motion, any aperiodic event can be an important sign of health (such as dizziness, falling or even a heart attack). Particularly, there is special interest to use micro-Doppler signature to identify human having aperiodic or reduced movements of their limbs. The aperiodic motion indicates the presence of injured or falling events, as shown in FIG. 3. Because of these facts, a dual-polarized micro-Doppler signature is one of the best candidates to characterize and classify human falling and maneuvering patterns.

This capability also allows for an embodiment to predict or detect micro signatures of cognitive decline by analyzing various movements of a person over time. As an example, the gait of a person may be used to determine early prognosis of certain disorders. The rate of a person's decline of his or her balance is another critical piece of information for health care providers or the person themselves for self-monitoring. Atypical patterns emerging from micro-Doppler signatures 601/602 may be used in conjunction with other medical information or neural imaging for enhanced decision-making regarding diseases and disorders.

FIG. 7 is one example of a fall type predicted or detected by a dual-polarized machine learning capable micro Doppler radar system. According to one embodiment, the prediction or detection of a trip produces a unique micro-Doppler signature. Variations may include a person breaking a fall with his or her hands. Other variations include landing on one's knees. Variations may produce slightly different but distinguishable micro-Doppler signatures. In the event of a trip, emergency services may be notified, other electronics such as video feeds or one-way or two-way communications may be established with the fallen individual.

FIG. 8 is a second example of a fall type predicted or detected by a dual-polarized machine learning capable micro Doppler radar system. According to one embodiment, the prediction or detection of a sideways fall produces a unique micro-Doppler signature. Variations may include a person breaking the fall with his or her hands or elbows. Other variations include landing on an object either in the transverse or sagittal planes. Objects may vary in height and reduce the distance traveled during the fall. Variations may produce slightly different but distinguishable micro-Doppler signatures. In the event of a sideways fall, emergency services may be notified, other electronics such as video feeds or one-way or two-way communications may be established with the fallen individual.

FIG. 9 is a third example of a fall type predicted or detected by a dual-polarized machine learning capable micro Doppler radar system. According to one embodiment, the prediction or detection of a sideways fall while standing from a chair produces a unique micro-Doppler signature. Variations may include a person breaking the fall with his or her hands or elbows. Other variations include landing on or flipping over an object either in the transverse or sagittal planes. Objects may vary in height and reduce the distance traveled during the fall. Variations may produce slightly different but distinguishable micro-Doppler signatures. In the event of a sideways fall while standing from a chair, emergency services may be notified, other electronics such as video feeds or one-way or two-way communications may be established with the fallen individual.

FIG. 10 is a fourth example of a fall type predicted or detected by a dual-polarized machine learning capable micro Doppler radar system. According to one embodiment, the prediction or detection of a backwards fall produces a unique micro-Doppler signature. Variations may include a person breaking the fall with his or her hands or elbows. Other variations include landing on one's gluteal. A fallen person may have raised or straight legs. Variations may produce slightly different but distinguishable micro-Doppler signatures. In the event of a backwards fall, emergency services may be notified, other electronics such as video feeds or one-way or two-way communications may be established with the fallen individual.

FIG. 11 is a fifth example of a fall type predicted or detected by a dual-polarized machine learning capable micro Doppler radar system. According to one embodiment, the prediction or detection of a backwards fall from standing up from a couch produces a unique micro-Doppler signature. Variations may include a person falling off the side of the couch or slumping over post fall. Variations may produce slightly different but distinguishable micro-Doppler signatures. In the event of a backwards fall from standing up from a couch produces, emergency services may be notified, other electronics such as video feeds or one-way or two-way communications may be established with the fallen individual.

FIG. 12 is a sixth example of a fall type predicted or detected by a dual-polarized machine learning capable micro Doppler radar system. According to one embodiment, the prediction or detection of a collapse produces a unique micro-Doppler signature. Variations may include a person falling in the transverse or sagittal planes. Other variations include landing on or flipping over an object either in the transverse or sagittal planes. Slumping may also occur. Variations may produce slightly different but distinguishable micro-Doppler signatures. In the event of a collapse, emergency services may be notified, other electronics such as video feeds or one-way or two-way communications may be established with the fallen individual.

FIG. 13 is a seventh example of a fall type predicted or detected by a dual-polarized machine learning capable micro Doppler radar system. According to one embodiment, the prediction or detection of a forwards fall while standing from a chair produces a unique micro-Doppler signature. Variations may include a person breaking the fall with his or her hands. Other variations include landing on his or her knees or landing on other objects such as coffee tables. Variations may produce slightly different but distinguishable micro-Doppler signatures. In the event of a sideways fall while standing from a chair, emergency services may be notified, other electronics such as video feeds or one-way or two-way communications may be established with the fallen individual.

The seven examples of falls (FIG. 7-FIG. 13) thus far illustrate a limited set of aperiodic movements but are not considered to be all-encompassing. Other embodiments may define and predict or detect other falls or movements such as ambulatory types (i.e., bipedal vs wheelchair). Further embodiments may use only one or more or some combination of the fall types. Training machine learning algorithms may entail using actors or other voluntary participants. Training data from other sources may be used such as video feeds, generative adversarial networks, and data sets.

Figure 14:
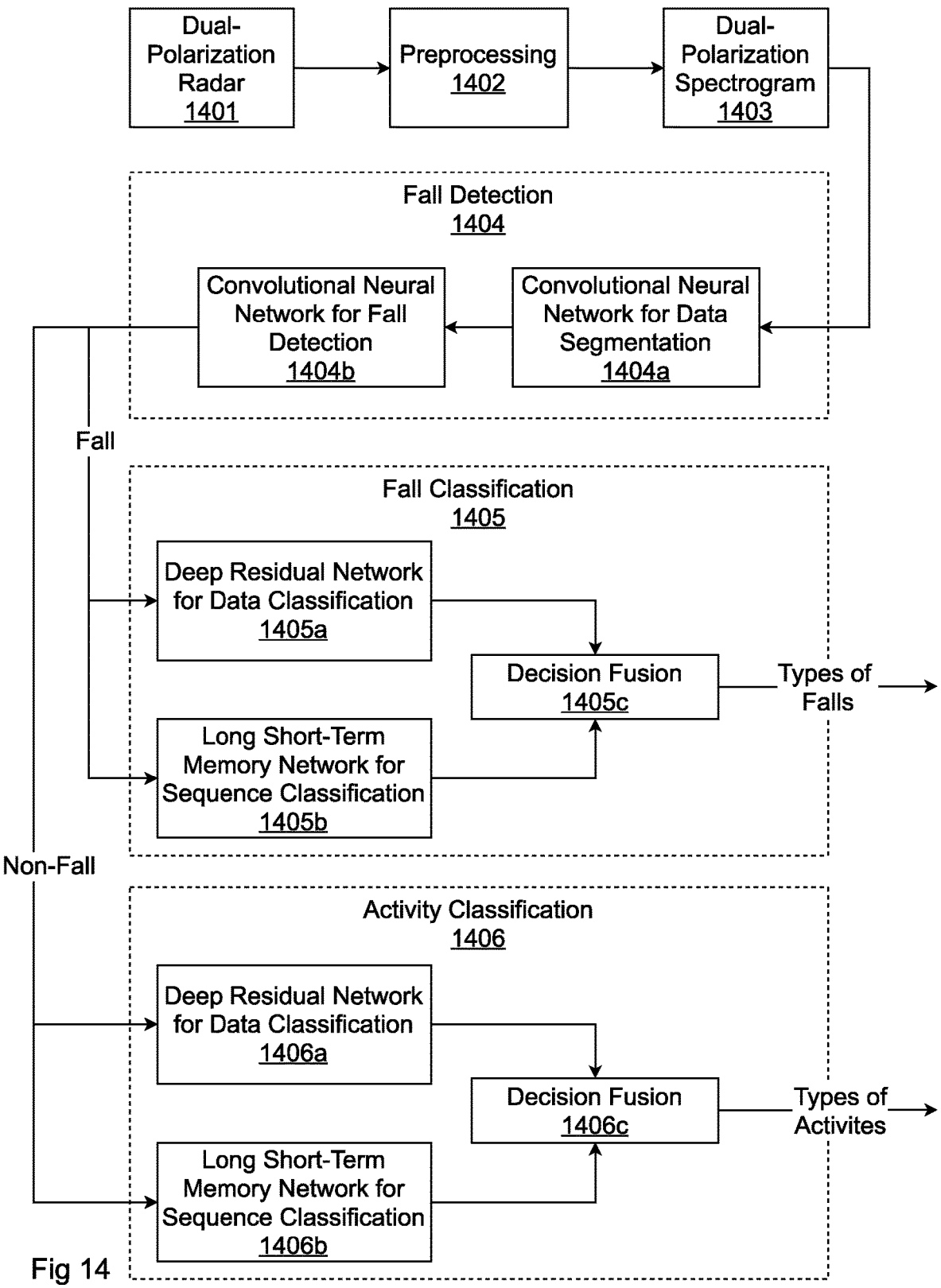
FIG. 14 is a flow diagram illustrating an exemplary method for a dual-polarized machine learning capable micro Doppler radar system, according to one aspect.

FIG. 14 is a flow diagram illustrating an exemplary method for a dual-polarized machine learning capable micro Doppler radar system, according to one aspect. Polarization techniques can extract information content simultaneously in the reflected co-polarized and cross-polarized data. A dual-polarization radar has four polarizations, represented by HH, VV, HV, and VH. A polarimetric S-matrix (scattering matrix) is often used to describe the connection between incident and scattered waves, and the fully polarimetric S-matrix provides four times more information than single-polarized radar. According to one embodiment, for a fully polarimetric radar to achieve a complete measurement, at least two transmitter channels with orthogonally-polarized antennas must be operated in a multiplexed procedure, such as in orthogonal frequency-division multiplex (OFDM) or time-division multiplex (TDM). Also, at least two orthogonally-polarized receiving channels must be operated simultaneously, such that the received signals can be sampled and digitized concurrently.

According to one embodiment, one or more dual-polarized radar(s) 1401 transmit and then receive radar signals designed to predict or detect micro-Doppler signatures. When using machine learning algorithms along with radar signals, some form of data preprocessing is optimal. This preprocessing usually involves denoising and data normalization. Here, the preprocessing stage 1402 operates on the signatures obtained using the spectrogram 1403. Denoising is performed by setting a threshold after estimating the noise in the spectrogram, to remove noise and normalize signatures to generate dual polarization.

A next step may be a fall prediction or detection process 1404 whereby according to one embodiment, a convolutional neural network (CNN) 1404*a* is used to conduct image segmentation (i.e., to segment the area that contains radar signatures from a fall). An architecture of the CNN 1404*a* involves multiple layers with various dimensions of matrices. It may take a radar signature image as input and output the probabilities for each class via a softmax function.

The image may first be reduced to the input size of a CNN. Based on one embodiment, the system may provide a highly accurate delineation of the boundaries of the regions of interest with very high Dice coefficient. Afterwards another CNN 1404b may be used to accurately predict and detect falls, whereby according to one embodiment, a transfer learning methodology may be used to transfer a previously trained network into an improved CNN. When an event is detected, it may be classified as either a fall or a non-fall and subsequently processed and classified as a fall 1405 or activity 1406. Examples of CNNs that may be used include GoogLeNet, U-Net, etc.

A residual neural network (ResNet) 1405a/1406a may be used to perform classification for different types of falls and activities. One frame (radar signature image) may be fed into the ResNet for classification and to identify and locate a fall area after the image is segmented with U-net. ResNet is a network architecture that allows training a large number of layers while still achieving compelling performance. The core implementation of ResNet is introducing identity shortcut connections that can skip one or more layers. Therefore, deeper networks may be obtained without causing a vanishing gradient issue. ResNet may also be used to classify multiple subclasses simultaneously.

Since falls involve a sequential movement from one position to another position, long short-term memory (LSTM) networks 1405b/1406b may be developed for classifying, processing, and making predictions based on time series data, since there can be lags of unknown duration between important events in a time series. LSTN is also designed to solve the problem of vanishing/exploding signals generated from falls. An LSTM cell is capable of learning long-term dependencies. An LSTM is composed of a cell (the memory part of the LSTM unit) and three "regulators", called gates, of the flow of information inside the LSTM unit: an input gate, an output gate, and a forget gate. Some variations of the LSTM unit do not have one or more of these gates or maybe have other gates. For example, gated recurrent units (GRUs) do not have an output gate.

According to one embodiment, results combined from different classifications may generate the optimal classification results. The decision fusion 1405c/1406c is a Bayesian detection problem that compares a likelihood ratio (between conditional probability of true detection vs. miss detection) with a minimum probability of detection error. The fusion process makes the final decision about the presence or absence of a target. An optimal decision fusion rule (Chair-Varshney fusion rule), obtained from a function of the probability of false alarms at each individual classifier and the probability of detection at the local sensor, will be used with implementation of modified back-propagation (BP) neural network training procedure: (1) create receiving operating characteristics (ROC) curves for each classifier or confusion matrix, including probabilities of true positives, false alarm, and false detection for individual classifier; (2) design a multiple layer neural network, such that their connections are initiated based on the Bayesian conditions; and (3) present the input and desired output to the network and apply BP training to update the weights.

According to one embodiment, a "divide-and-conquer" strategy and supervised back propagation training mechanism may be used to train each of modules (CNN, ResNet, and LSTM) individually. The system may then combine the decision results using decision fusion to maximize the strength of each individual classifier to generate the optimal classifier. Each radar signature image may be labelled as different types of falls (e.g., hard vs. soft falls) and non-falls (gait, sitting, etc.). Among collected radar signature images, a stratified 10-fold cross validation may be applied to repetitively train and validate the noted modules. According to another embodiment, different resampling approaches (e.g., bootstrap) may be used to train and validate the modules to minimize the variance and bias of performance outcomes. A performance of trained modules may be analyzed by using common performance metrics such as receiver operating characteristic (ROC) curves, area under the ROC curve (AUC), sensitivity, specificity, and F1 score.

This methodology is only exemplary and a person with ordinary skill in the art may employ any number or combinations of machine learning algorithms to achieve the desired results.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 15:
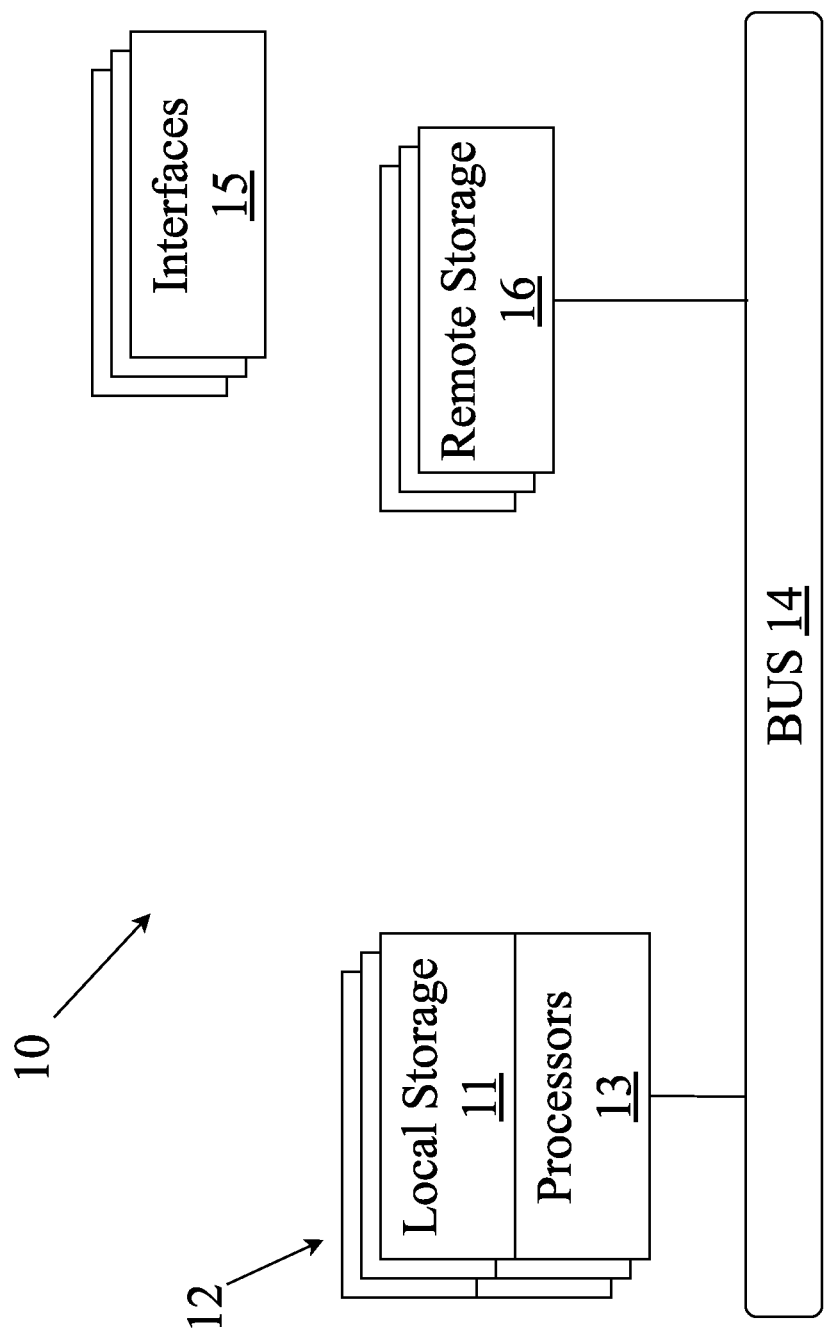
FIG. 15 is a block diagram illustrating an exemplary hardware architecture of a computing device.

Referring now to FIG. 15, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory.

Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 15 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 16:
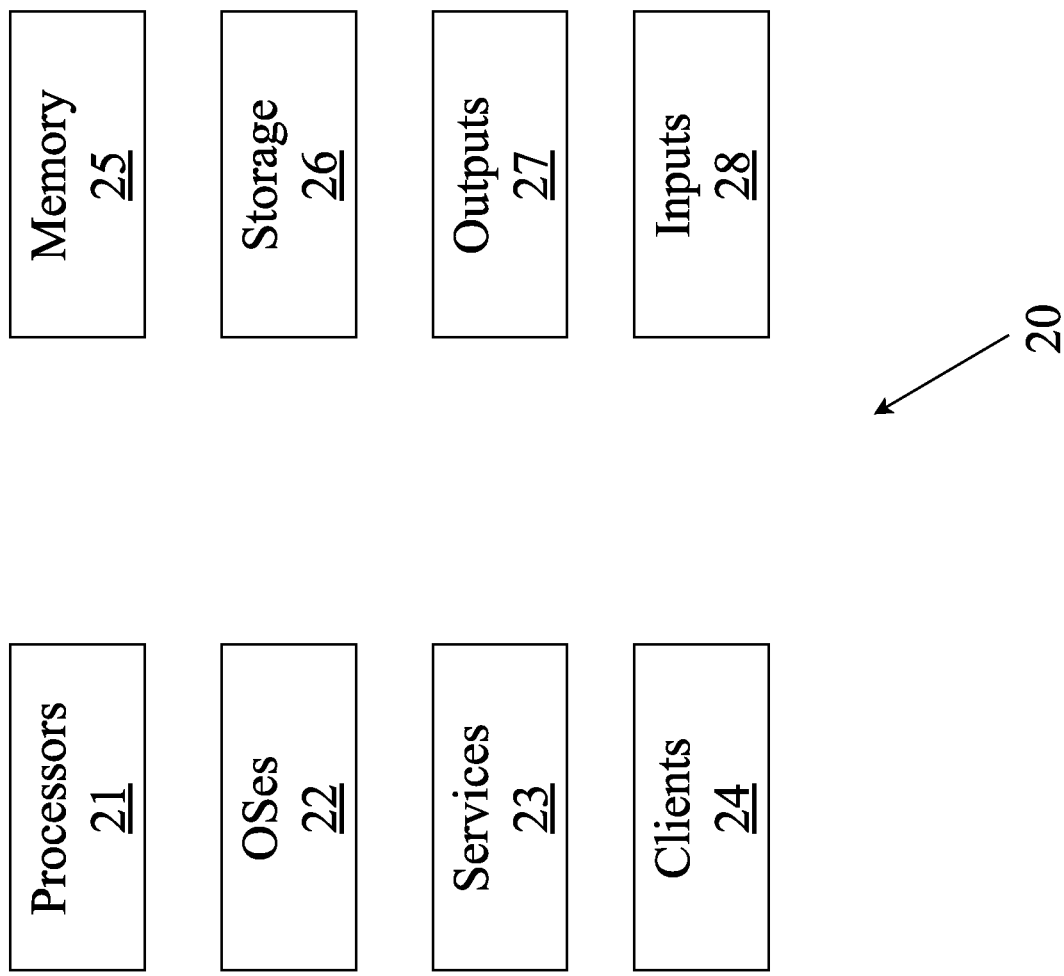
FIG. 16 is a block diagram illustrating an exemplary logical architecture for a client device.

In some aspects, systems may be implemented on a standalone computing system. Referring now to FIG. 16, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 15). Examples of storage devices 26 include flash memory, magnetic hard drive, CD-ROM, and/or the like.

Figure 17:
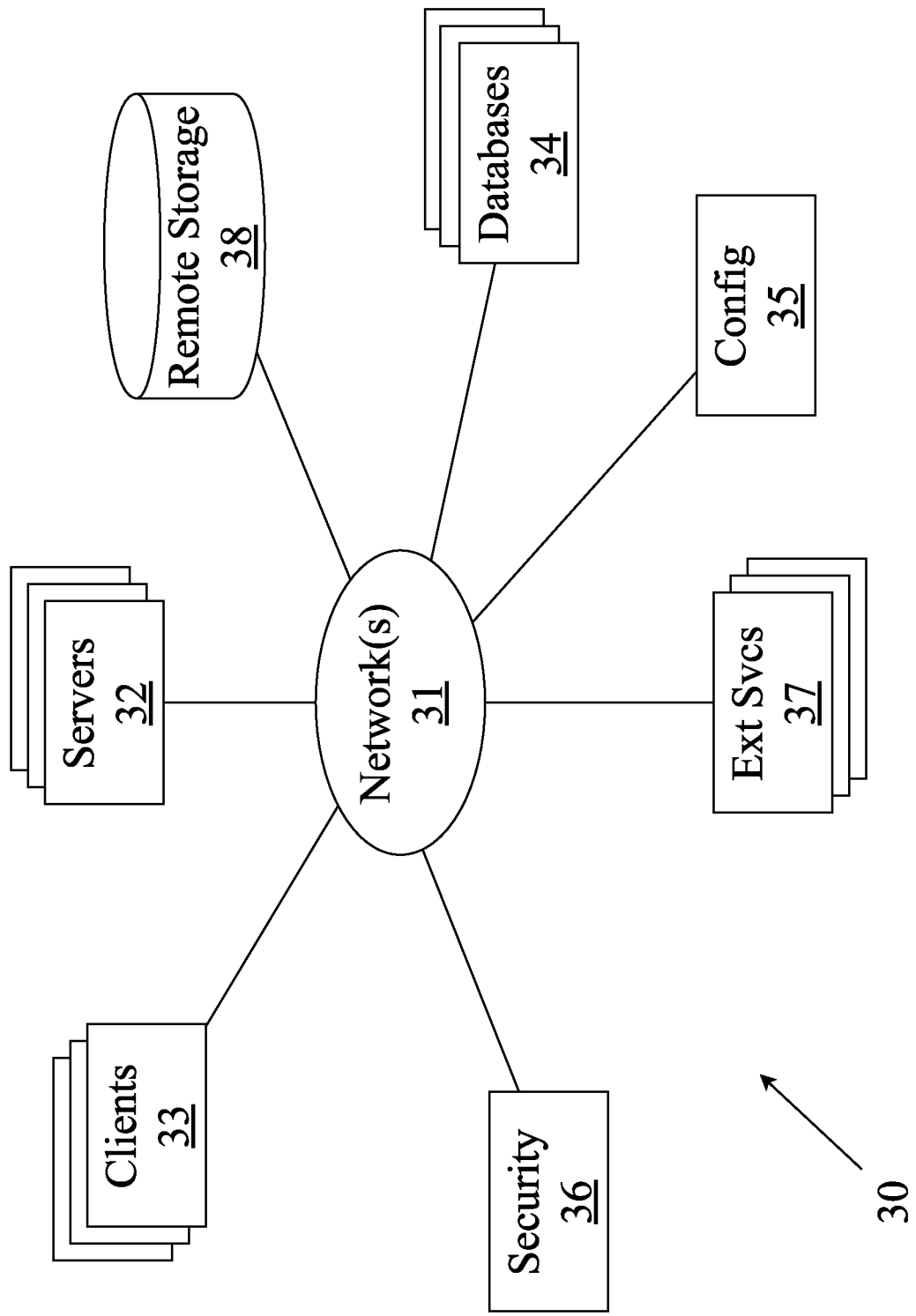
FIG. 17 is a block diagram showing an exemplary architectural arrangement of clients, servers, and external services.

In some aspects, systems may be implemented on a distributed computing network, such as one having any number of clients and/or servers. Referring now to FIG. 17, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 16. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 18:
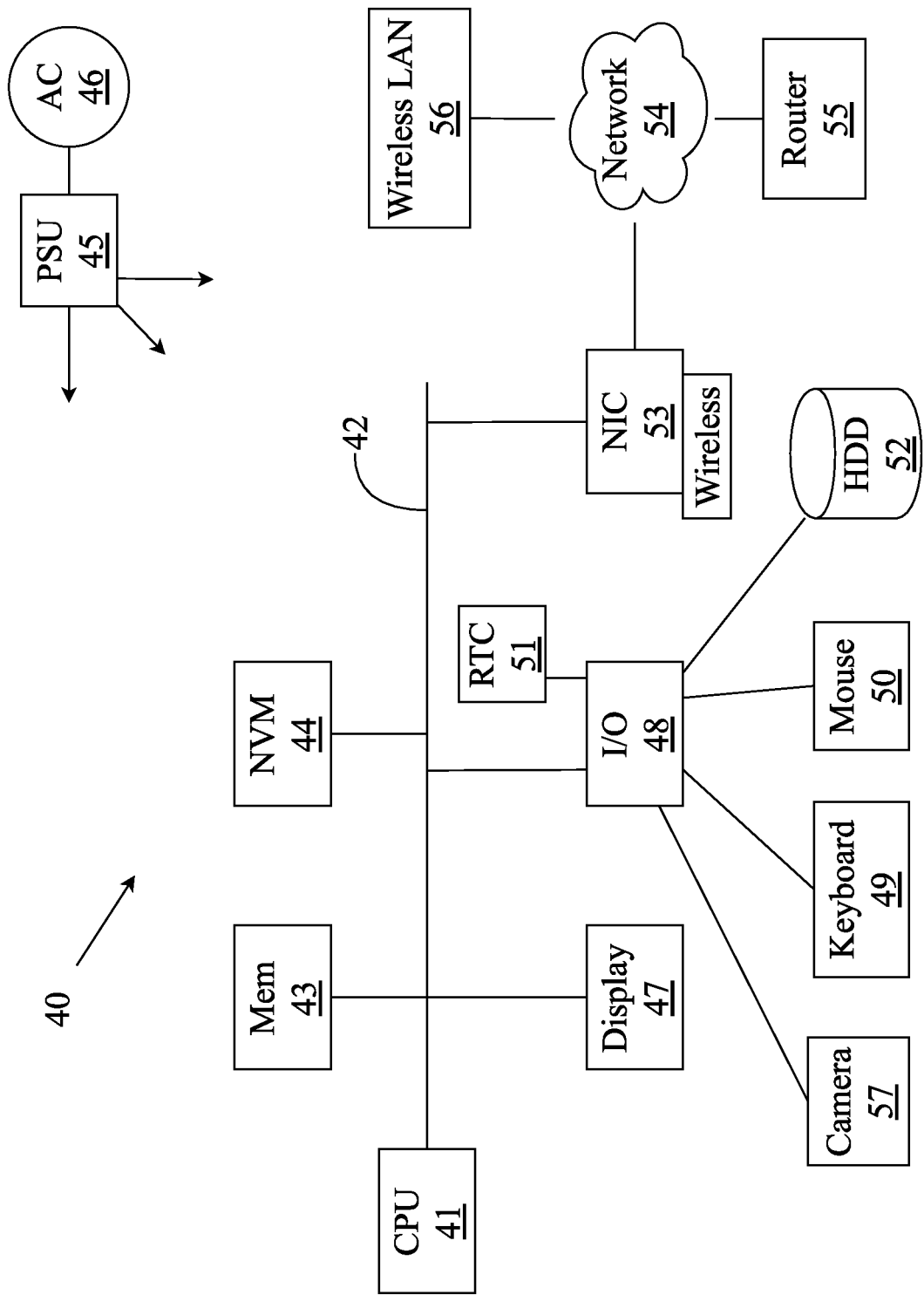
FIG. 18 is another block diagram illustrating an exemplary hardware architecture of a computing device.

FIG. 18 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for fall prediction and detection comprising:
   a computing device comprising a memory, a processor, and a non-volatile data storage device; and
   a radio-frequency module comprising electronic components that cause the radio-frequency module to:
     transmit an electromagnetic wave;
     receive a reflected electromagnetic wave;
     convert the reflected electromagnetic wave into a digital signal; and
     send the digital signal to a processor module;
   the processor module comprising a first plurality of programming instructions stored in the memory of, and operating on the processor of, the computing device, wherein the first plurality of programming instructions, when operating on the processor, cause the computing device to:
     receive the digital signal from the radio-frequency module;
     process the digital signal into a spectrogram; and
     process the spectrogram through one or more machine learning algorithms for predicting and detecting falls
   wherein the system for fall prediction and detection uses one or more dual-polarized radio frequency modules whereby a pair of orthogonal electromagnetic waves are transmitted and received into a combined spectrogram processed by one or more machine learning algorithms for predicting and detecting falls.

2. The system of claim 1, wherein the processor module is a software defined radio that can dynamically adapt to the available communication environment.

3. The system of claim 1, wherein the processor module is connected to a network whereby upon detection of a specified event, an alarm or notification is triggered.

4. The system of claim 1, wherein the machine learning algorithms detect any movement or behavior.

5. The system of claim 1, wherein the machine learning algorithms are trained on time-series data.

6. The system of claim 1, wherein the machine learning algorithms are computed on a cloud-based Internet service.

7. The system of claim 1, wherein the processor module is a distributed computing platform.

8. The system of claim 1, further comprising a graphical user interface whereby a user may interact with the dual-polarized radio frequency module or processor module inputs, settings, and outputs.

9. The system of claim 1, wherein the combined spectrogram and machine learning algorithms are used to assist in the diagnosis of human conditions.

10. A method for fall prediction and detection comprising the steps of:
    transmitting an electromagnetic wave;
    receiving a reflected electromagnetic wave;
    converting the reflected electromagnetic wave into a digital signal; and
    processing the digital signal into a spectrogram;
    processing the spectrogram through one or more machine learning algorithms for predicting and detecting falls;
    wherein the system for fall prediction and detection uses one or more dual-polarized radio frequency modules whereby a pair of orthogonal electromagnetic waves are transmitted and received into a combined spectrogram processed by one or more machine learning algorithms for predicting and detecting falls.

11. The method of claim 10, wherein the processor module is a software defined radio that can dynamically adapt to the available communication environment.

12. The method of claim 10, wherein the processor module is connected to a network whereby upon detection of a specified event, an alarm or notification is triggered.

13. The method of claim 10, wherein the machine learning algorithms detect any movement or behavior.

14. The method of claim 10, wherein the machine learning algorithms are trained on time-series data.

15. The method of claim 10, wherein the machine learning algorithms are computed on a cloud-based Internet service.

16. The method of claim 10, wherein the processor module is a distributed computing platform.

17. The method of claim 10, further comprising a graphical user interface whereby a user may interact with the dual-polarized radio frequency module or processor module inputs, settings, and outputs.

18. The method of claim 10, wherein the combined spectrogram and machine learning algorithms are used to assist in the diagnosis of human conditions.

19. A system for fall prediction and detection comprising:
    a smart phone comprising a memory, a processor, and a non-volatile data storage device; and
    a radio-frequency module comprising electronic components that cause the radio-frequency module to:
      transmit an electromagnetic wave;
      receive a reflected electromagnetic wave;
      convert the reflected electromagnetic wave into a digital signal; and
      send the digital signal to the smart phone;
    the smart phone further comprising a plurality of programming instructions stored in the memory of, and operating on the processor, wherein the plurality of programming instructions, when operating on the processor, cause the smart phone to:
receive the digital signal;
process the digital signal into a spectrogram; and
process the spectrogram through one or more machine learning algorithms for predicting and detecting falls;
wherein the system for fall prediction and detection uses one or more dual-polarized radio frequency modules whereby a pair of orthogonal electromagnetic waves are transmitted and received into a combined spectrogram processed by one or more machine learning algorithms for predicting and detecting falls.

* * * * *